United States Patent [19]

Sander et al.

[11] Patent Number: 5,760,551
[45] Date of Patent: *Jun. 2, 1998

[54] AUTOMATIC RE-ARRANGEMENT AND DISTRIBUTION DEVICE FOR TELECOMMUNICATION AND DATA LINES

[75] Inventors: Claus Sander, Berlin; Ingo Dohnke, Teltow; Hans-Ulrich Paasch, Berlin; Ulrich Warmbold, Berlin; Gunter Hegner, Berlin; Hans-Joachim Faika, Berlin, all of Germany

[73] Assignee: Krone Aktiengesellschaft, Berlin-Zehlendorf, Germany

[ * ] Notice: The term of this patent shall not extend beyond the expiration date of Pat. No. 5,576,603.

[21] Appl. No.: 722,356

[22] Filed: Sep. 27, 1996

[30] Foreign Application Priority Data

Sep. 29, 1995 [DE] Germany .................. 195 37 533.5

[51] Int. Cl.[6] .................................................. H02K 7/14
[52] U.S. Cl. .................. 318/3; 200/175; 361/827; 361/828; 379/828; 379/326; 379/328
[58] Field of Search ....................... 318/3; 200/175; 361/827, 828; 379/227, 326, 328

[56] References Cited

U.S. PATENT DOCUMENTS

| | | | |
|---|---|---|---|
| 4,406,510 | 9/1983 | Debortoli et al. | 318/3 |
| 4,603,377 | 7/1986 | Kobayashi et al. | 361/832 X |
| 4,709,463 | 12/1987 | Cristescu et al. | 379/291 |
| 5,576,603 | 11/1996 | Sander | 318/3 |

*Primary Examiner*—Karen Masih
*Attorney, Agent, or Firm*—McGlew and Tuttle

[57] ABSTRACT

An automatic rearrangement and distribution device for telecommunication and data lines with connection terminals for exchange office and subscriber lines and a remote controllable connection device having a gripping element. To automate a re-arrangement and distribution device provided with connection blocks, the connection terminals are disposed in connection blocks radially directed relative to a central axis. The connection device is swingable in central axis, and a gripping element is disposed radially displaceably at the connection device. For connecting the rearrangement and distribution device to copper cables as well as to fiber-glass cables, without modifications being required, the control paths at blocks for fiber-glass and for copper cable applications have identical lengths.

13 Claims, 5 Drawing Sheets

AUTOMATIC RE-ARRANGEMENT AND DISTRIBUTION DEVICE FOR TELECOMMUNICATION AND DATA LINES

FIELD OF THE INVENTION

The present invention relates to an automatic rearrangement and distribution device for telecommunication and data lines, comprising connection terminals for exchange office and subscriber lines and a remotecontrollable connection device having a gripping element according to German Patent No. 44 20 806.

BACKGROUND OF THE INVENTION

An automatic re-arrangement and distribution device of the type referred to hereinbefore will become known from German Patent No. 44 20 806 (see also U.S. application Ser. No. 08/470,069, which is hereby incorporated by reference).

In this automatic re-arrangement and distribution device it is provided that the connection terminals are disposed in connection blocks radially directed relative to a central axis, the connection device is swingable in the central axis, and the gripping element is disposed radially displaceably at the connection device. The subscriber cables are rigidly connected to the connection terminals of the terminal blocks, and the exchange office cables spread in conetype manner as a bundle starting from the end of the central axis are connected by means of the gripping element of the connection device to the connection terminals of the terminal blocks. The gripping element can in a simple manner be swung between the terminal blocks arranged in ray-type manner around the central axis, and can be rotated in swung-in condition about the central axis, without being obstructed by the connected exchange office cables. The terminal blocks are formed in particular as secants to a fictitious spherical segment or as arcs in the fictitious spherical segment, the center of which lies on the central axis. In the latter case, the exchange office cables spread in a cone-type manner have all the same lengths and can thus be connected by means of the gripping element in any desired position to a connection terminal in a terminal block. For this purpose, the terminal blocks have plug elements for receiving plugs provided at the ends of the exchange office cables.

For the attachment of temporarily or permanently not needed exchange office cables, depot blocks provided with plug elements only are disposed on a portion of the fictitious spherical segment beside the terminal blocks disposed on another portion of the spherical segment and provided with insulation displacement contact elements for the connection to the subscriber cables.

The housing is composed of a downwardly open bell surrounding the terminal and depot blocks disposed in the fictitious spherical segment and of a cone-type housing spanned by the bell and receiving the connection device showing vertically downwards with its free end. The thus configured automatic distribution device can be located by means of a wall holder or a column above or as well under ground, the automatic distribution device being capable, in the underground version of bell and housing, to be installed in a flood-protected manner according to the Caisson principle.

The automatic re-arrangement and distribution device is suitable for copper cables as well as for light waveguides, requires however special measures when using it for light waveguides.

SUMMARY AND OBJECTS OF THE INVENTION

It is therefore the primary object of the invention to improve an automatic rearrangement and distribution device of the type referred to hereinbefore so that it can be connected to copper cables as well as fiberglass cables, without modifications being required.

According to the invention, an automatic re-arrangement and distribution device for telecommunication and data lines is provided including connection terminals for exchange office and subscriber lines and a remote-controllable connection device having a gripping element and control paths provided having identical lengths, the control paths being provided at blocks for fiber/glass and copper cable applications.

The connection device includes the grip element and is controllable remotely. The connection device is pivotably supported along the central axis, said grip element being movable radially to be swung out from the connection device. A rotatably-driven axis of rotation element is supported at said central axis. An electric motor is provided for driving said rotatably-driven axis of rotation element. A swing arm is pivotably supported by the rotatably-driven axis of rotation element and has a free end carrying the grip element. A jib arm approximately centrally engages the swing arm, the jib arm having another end supported at a motor-driven vertical drive carried by said rotatably-driven axis of rotation element.

Plugs are prefereably provided including a locking mechanism preventing the plugs from falling out of blocks and simultaneously achieving a transportation protection on the travel to the next position.

Scanning elements are preferably connected to blocks for the exact positioning of swivel arm with gripping element on the plug or removal location at blocks.

Transportation paths are preferably determined by numbers of steps of stepping motors.

The blocks are preferably provided with cable connections which are accessible from above, for the insertion of test plugs. The plugs preferably have gripping surfaces.

The controller is preferably provided so as to optimize transportation paths, by removing plugs from a depot block assigned to the distribution segment, and by moving to the plug position from zero position (reference point) in the same direction. The reference point is preferably simultaneously a test point and is provided with a plug position with test tapping portion permitting an inspection of the plug or of the line. The control signals and the supply voltage are preferably fed over a common double wire and separated in the distribution device by a switch. The supply voltage of a standard subscriber line is preferably used for buffering the battery.

The cover and housing are preferably configured such that by the Caisson principle during flooding water will be stopped still underneath the cable entries and will not enter into the interior of housing even with defective seals. The blocks are preferably configured also on the cable connection side as arcs adapted to the fictitious (imaginary) spherical shape. The insulation displacement contact elements of a block and the coupling elements of the fiber-glass (fiber optic)cables preferably have identical lengths.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
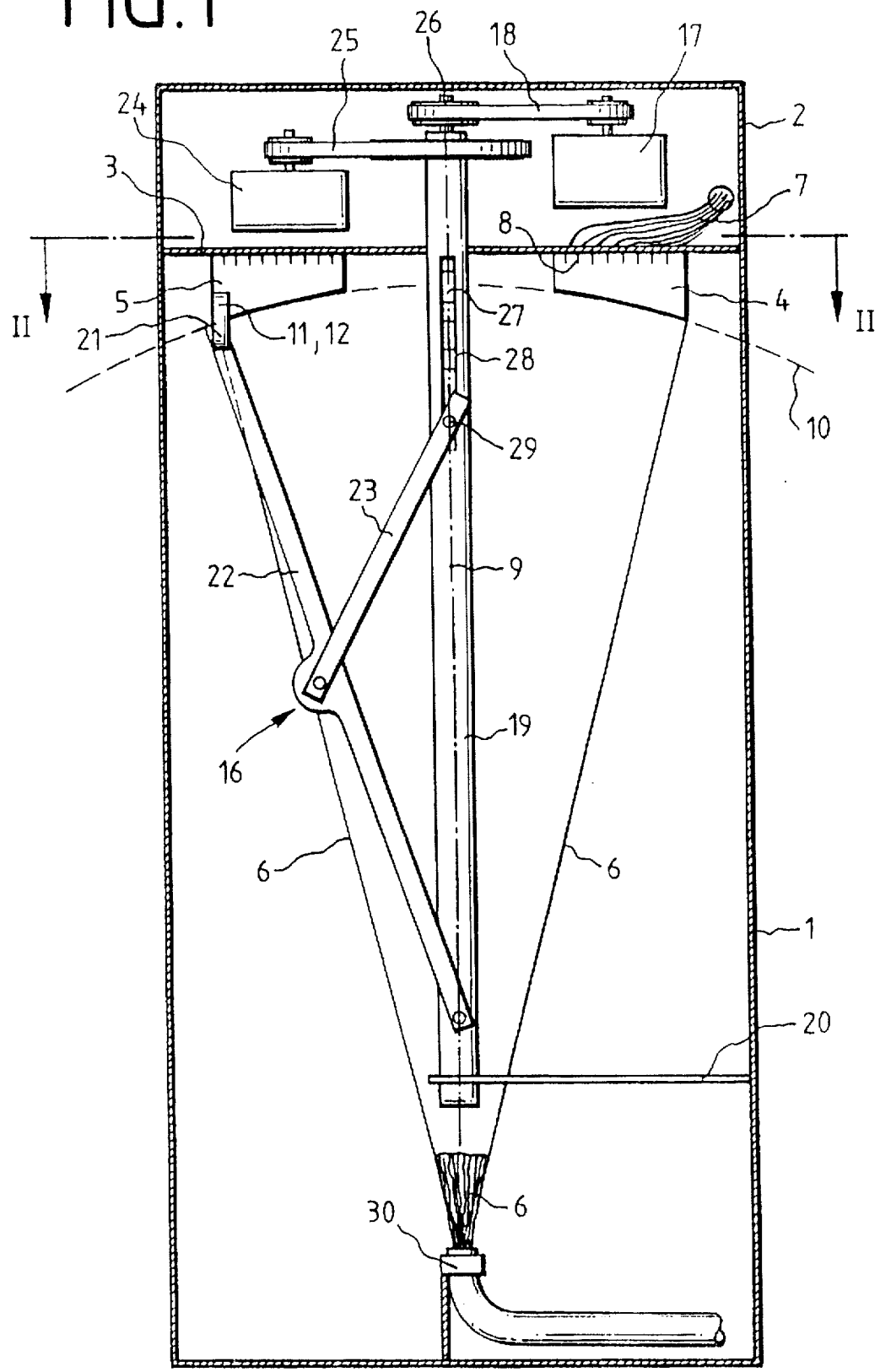
FIG. 1 is a vertical sectional view of the device according to the invention.
Figure 2:
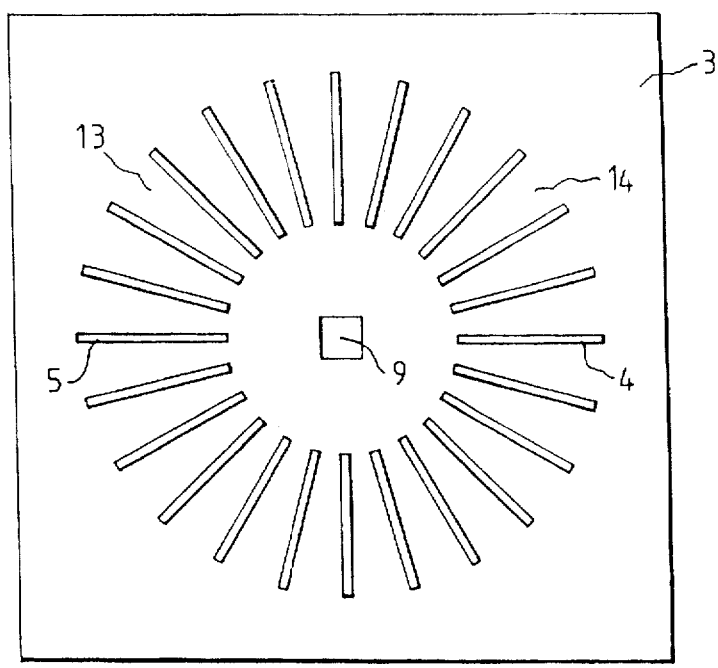
FIG. 2 is a sectional view along line II—II in FIG. 1.
Figure 3:
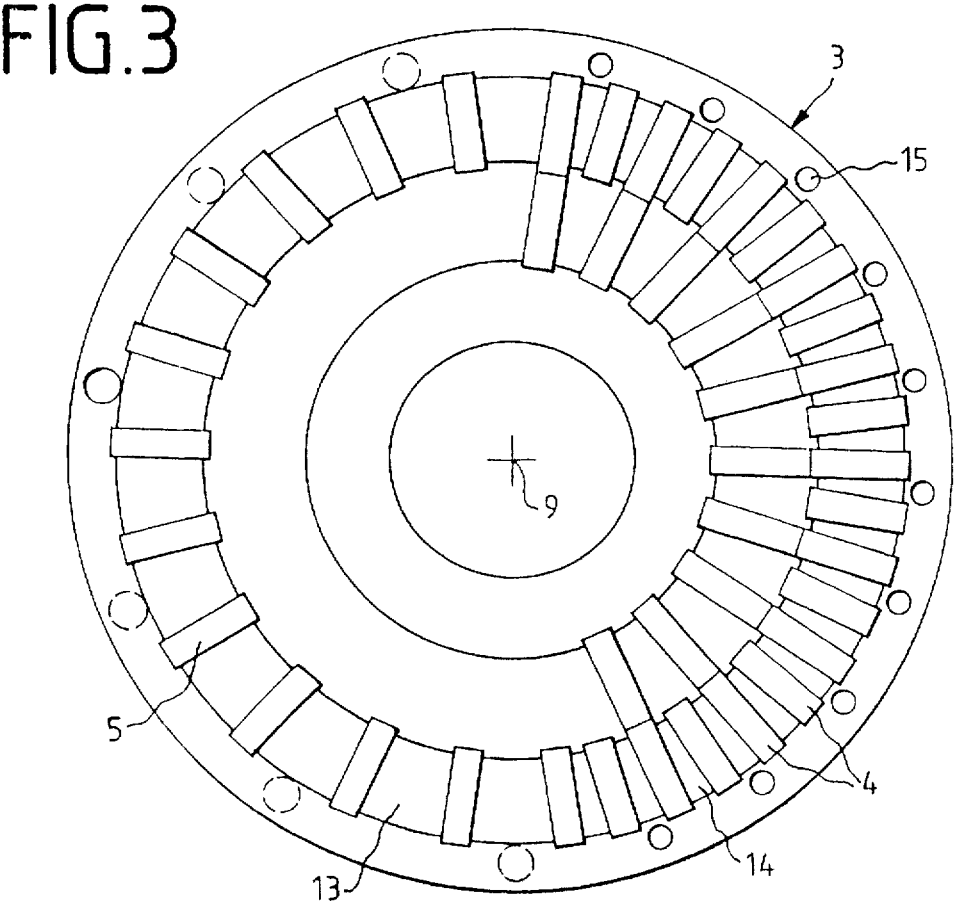
FIG. 3 is a top view of an intermediate bottom receiving the terminal and depot blocks.
Figure 4:
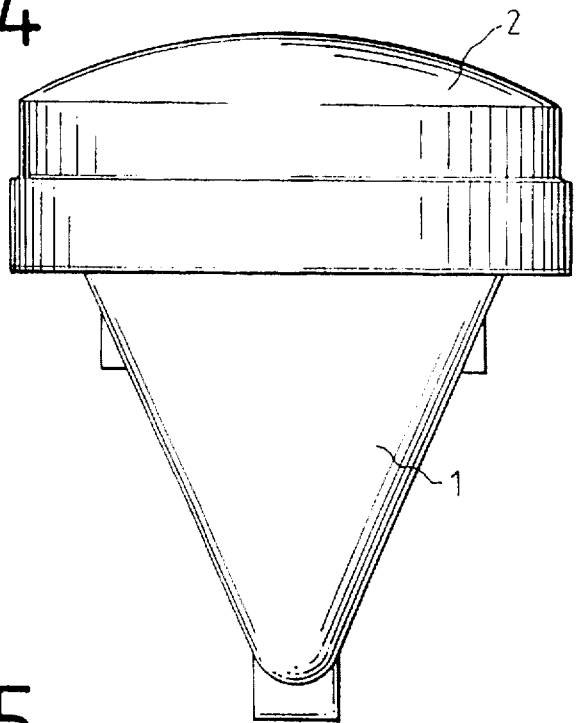
FIG. 4 is a side view of the distribution device closed by a bell and cone-type housing.
Figure 5:
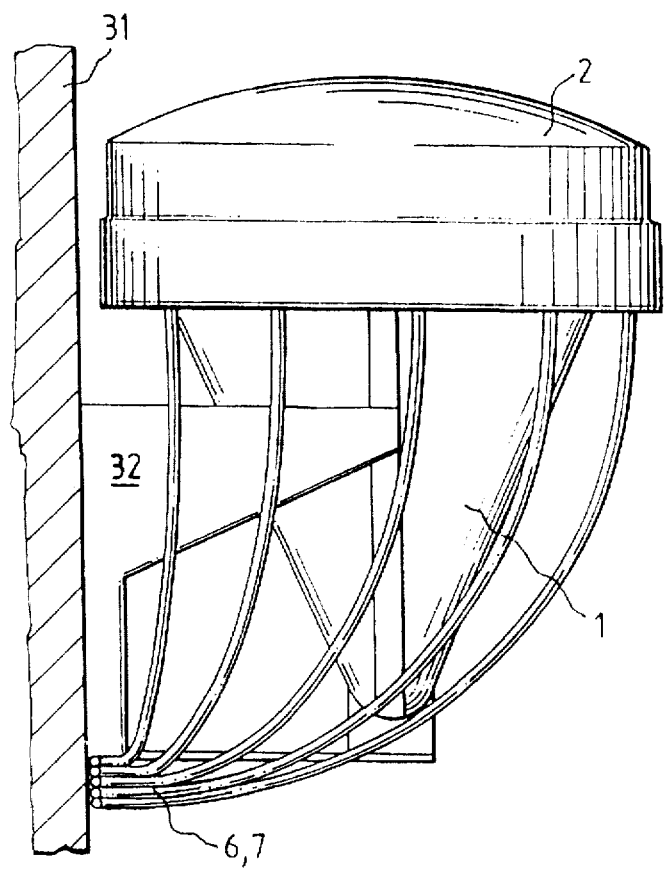
FIG. 5 is a side view of the distribution device of FIG. 4 in a wall-mounted version.

The automatic re-arrangement and distribution device for telecommunication and data lines comprises a box-type housing 1 as shown in FIG. 1 or a cone-type housing 1 as in the other embodiments and a cover-type bell 2 closing housing 1 towards top, both made of plastic or aluminium. In housing 1, below bell 2, a multitude of connection and depot blocks 4, 5 are disposed at an intermediate bottom 3, connection blocks 4 being provided with connection terminals for exchange office and subscriber cables 6 or 7, respectively subscriber cables 7 are connected underneath bell 2 to insulation displacement contact elements 8 of connection blocks 4 forming connection terminals. As is shown in FIGS. 2 and 3, connection blocks 4 provided with the connection terminals, for instance in the form of insulation displacement contact elements 8, and depot blocks 5 are directed radially or in ray-type manner relative to the central axis 9 of the distribution device. Further, connection blocks 4 and also depot blocks 5 have, as is shown in FIG. 1, at least on one side a circular arc shape and are thus located in a fictitious spherical segment 10, the center of which lies on the central axis 9. Alternatively the connection and depot blocks 4 or 5, respectively, can also be secants or tangents to fictitious spherical segment 10, the perpendicular line to the upper side of the aligned connection and depot blocks 4, 5 passing through the center of fictitious spherical segment 10.

Figure 8:
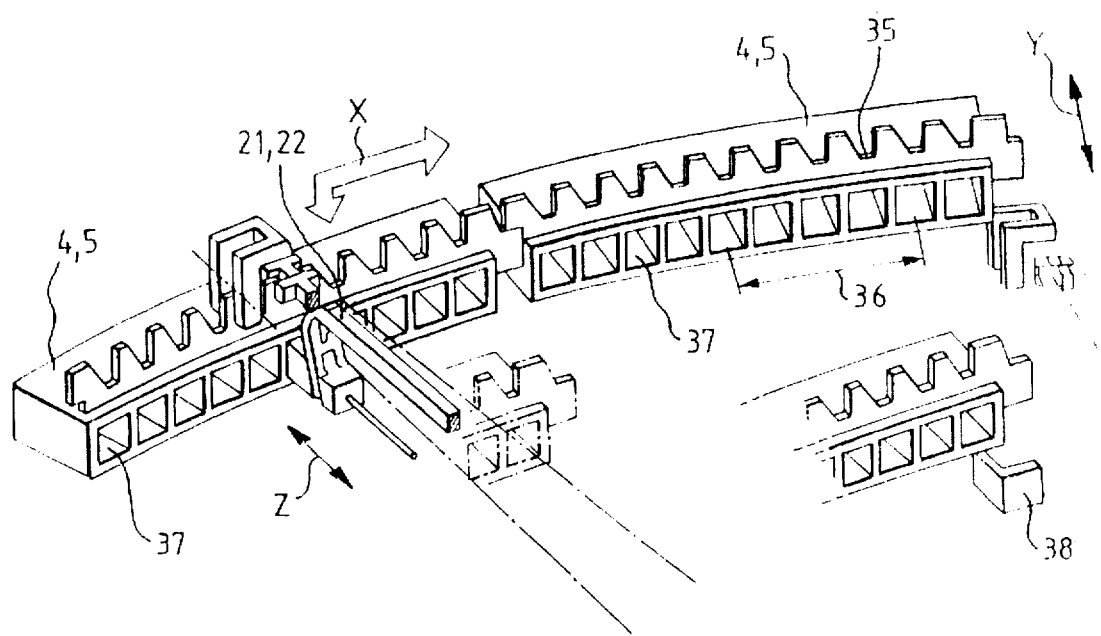
FIG. 8 is a schematic perspective representation (detail) of a block arrangement with both-sides with circular blocks and the illustrated transportation or control paths, respectively.

In another embodiment shown in FIG. 8, the connection and depot blocks 4, 5 have circular arc shapes on both sides, that is also on the cable connection side.

Connection as well as depot blocks 4, 5 are provided with plug elements 11 for receiving plugs 12 attached at the ends of exchange office cables 6. Plugs 12 comprise gripping surfaces, in order that they can also be removed by hand.

Blocks 4, 5 provided with cable connections are accessible from above, for the insertion of not shown test plugs.

As is shown in FIGS. 2 and 3, connection blocks 4 comprising insulation displacement contact elements 8 are disposed on a portion of fictitious (imaginary) spherical segment 10 for the connection to subscriber cables 7. Depot blocks 5 only provided with plug elements 11 are disposed on another portion of fictitious spherical segment 10. The density of connection blocks 4 shown on the right-hand side of FIG. 3 is higher than the density of depot blocks 5 shown on the left-hand side of FIG. 3. In the shown example, one depot block 5 is provided for three connection blocks 4. It is essential that between depot blocks 5 arranged in ray-type manner as well as between connection blocks 4 also arranged in ray-type manner, radial free spaces 13, 14 will remain, the purpose of which will be described further below. The embodiment of intermediate bottom 3 shown in FIG. 3 further comprises at its outer periphery a number of through-openings 15 serving for passing the cables through.

Within housing 1, which is of the cone-type in this embodiment, a connection device 16 is disposed comprising an axis of rotation 19 supported on central axis 9 and rotatably driven by an electric motor 17 and a belt drive 19. The axis of rotation is supported in intermediate bottom 3 and a bearing arm 20. A swivel arm 22 is pivoted at the free end of axis of rotation 19 and carries a gripping element 21 at its free end. A guide arm 23 acts approximately on the center of swivel arm 22. The other end of the guide arm is pivoted at a vertical drive 26 supported on an axis of rotation 19. The motor is driven by means of an electric motor 24 and a belt drive 25. The vertical drive is composed of a spindle 25 rotatably held on axis of rotation 19 and rotatably driven by motor 24 over belt drive 25, together with a spindle nut 29 rotatable thereon and guided in a vertical groove 28 of axis of rotation 19. The spindle nut is attached at the end of guide arm 23. By a rotary movement of spindle 27 caused by electric motor 24 over belt drive 25, spindle nut 29 is moved up and down in vertical groove 28 of axis of rotation 19, thus guide arm 23 being actuated and swivel arm 22 being moved outwards and inwards. Thereby gripping element 21 pivoted at the free end of swivel arm 22 can be swung parallely to ray-type connection and depot blocks 4, 5 and therebetween outwards and inwards. With inwardly swung gripping element 21, axis of rotation 19 can be rotated under the action of electric motor 17 and belt drive 18, so as to swing gripping element 21 into another of free spaces 13, 14 between connection and depot blocks 4, 5.

Electric motors 17, 14 are in a preferred embodiment stepping motors, in order to secure an exact positioning of swivel arm 22 with gripping element 21 by defined numbers of steps.

The distribution device described above operates as follows:

First subscriber cables 7 are connected to insulation displacement contact elements 8 of connection blocks 4 accessible from above.

Exchange office cables 6 still bundled in a cable suspension 30 underneath the lower end of axis of rotation 19 and then made free are all cut to the same length and provided at their free ends with plugs 12 inserted into plug elements 11 of depot blocks 5. The thus prepared distribution device can now, via a remote control signal from a not shown exchange office, be connected as well as re-arranged without using further jumper wires. For this purpose, only an actuation of electric motors 17, 24 and of gripping element 21 is required, these units being connected to the remote control in a manner not shown here. The control signals and the supply voltage are fed over a common double wire and separated in the distribution device by a not shown switch.

For the establishment of a line connection between an exchange office and a subscriber cable 6 or 7, respectively, plug 12 of exchange office cable 6 to be assigned to a specific subscriber cable 7 is gripped by gripping element 21 and moved by its swing and rotational movement to plug element 11 of respective subscriber cable 7, and is inserted there, whereupon gripping element 21 is released and can be used for a new connection process. In a corresponding manner there is achieved a re-arrangement of an existing line by that respective plug 12 of a subscriber cable 7 is pulled out from the respective plug element 11 by means of gripping element 21 moving thereto, and is moved by swinging and displacing gripping element 21 to plug element 11 of new subscriber cable 7. In this way, connections and re-arrangements of the automatic distribution device are achieved in the same way, no jumpper wire being required for re-arrangements. The same length of all exchange office cables 6, measured from cable suspension 30, effects that each plug 12 of each exchange office cable 6 can be supplied to any plug element 11 of a subscriber cable 7. Since thereby all exchange office cables 6 are relatively tightened within housing 1, swivel arm 22 can freely be moved or swung in the free spaces 13, 14 between connection and depot blocks 4, 5, together with gripping element 21.

The automatic distribution device is suitable not only for copper cables, but also for light waveguides (glass fiber guides, fiber optic guides, strands, etc), because of the defined and large bending radii.

In order to connect copper and fiber-glass (fiber optic) cables without the need of modifying the re-arrangement and distribution device, plugs 12, in the shown example, are modified for the fiber-glass and copper application such that control paths Z (FIG. 8) at blocks 4, 5 have equal lengths for the fiber-glass and for the copper application. The not shown receiving portions for blocks 4, 5 are configured, too, such that they can receive blocks 4, 5 for copper cable and fiberglass connections. Control path Z is defined, according to the representation in FIG. 8, as the distance required for removing and mounting plugs 12 at blocks 4, 5. In the representation of FIG. 8, this distance Z is marked by a double arrow. Plugs 12 thus must have, together with swivel arm 22 and gripping element 21, identical length dimensions for the fiber-glass and the copper cable application. Moving respective plug 12 for establishing a line connection between an exchange office and a subscriber cable 6, 7 by a swing and a rotational movement of gripping element 21 always takes place from a reference point (zero) 38, in order to compensate technologically given inaccuracies at blocks 4, 5 and in the control part. Gripping element 21 is moved back after each connection process to a defined zero position 38 and starts moving again from this zero position for another connection process. Reference point 38 is simultaneously a test point and is provided with a plug position with test tapping portion permitting an inspection of plug 12 or of the line.

The distance to be overcome between the individual connection processes is defined as a transportation path and is marked in FIG. 8 by double arrows X, Y. The controller optimises the transportation paths, by removing plugs 12 from depot block 5 assigned to the distribution segment, and by moving to the plug position from zero position 38 in always the same direction.

The transportation paths are defined by the number of steps and are obtained by stepping motors 17, 24 (FIG. 1). Thereby reliable positioning of swivel arm 22 with gripping element 21 on plug or removal location 37 at blocks 4, 5 is secured. Exact positioning is further ensured by scanning elements 35 (FIG. 8) integrated in blocks 4, 5. Optical scanning elements 35 are selected in FIG. 8 that can become effective together with not shown light barriers. Mechanical or non-contact electronic scanning elements 35, inductive or capacitive elements can also be used. From the combination of both positioning means, numbers of steps for the distances achieved and optical scanning elements 35, a reference model between distances and times by numbers of steps can be built up to the scanning features and can be used for correcting faults.

Plugs 12 comprise a not shown locking mechanism preventing plugs 12 from falling out from blocks 4, 5 and simultaneously achieving a transportation protection on the travel to the next connection position. The locking mechanism secures that when pulling plug 12 out, the latter will be unlocked at block 4, 5 and locked at gripping element 21. When inserting plug 12, the latter will be unlocked at gripping element 21 and locked in block 4, 5 after insertion.

Figure 6:
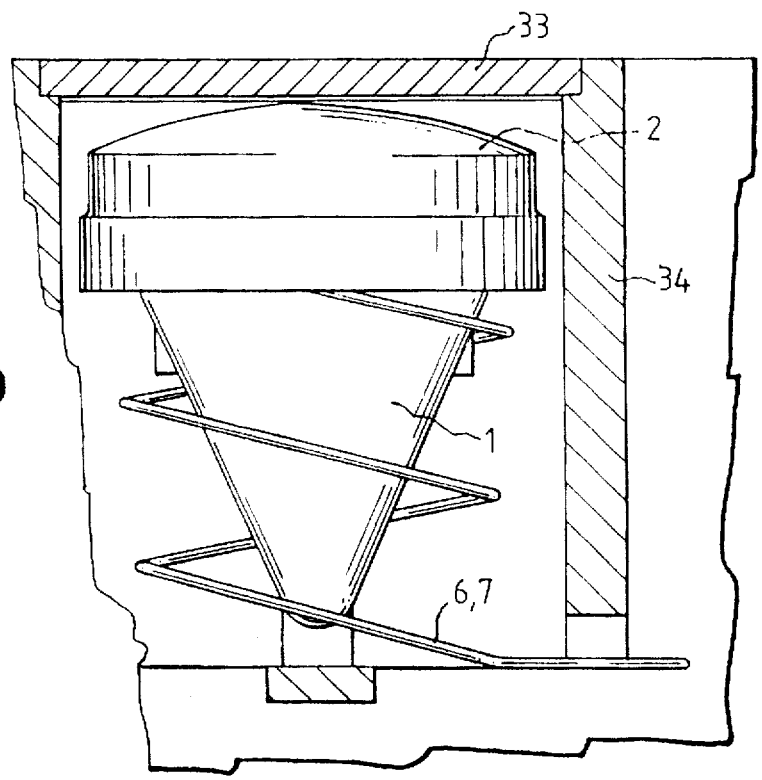
FIG. 6 is a side partially sectional view of the distribution device of FIG. 4 in underground version, in operating condition.
Figure 7:
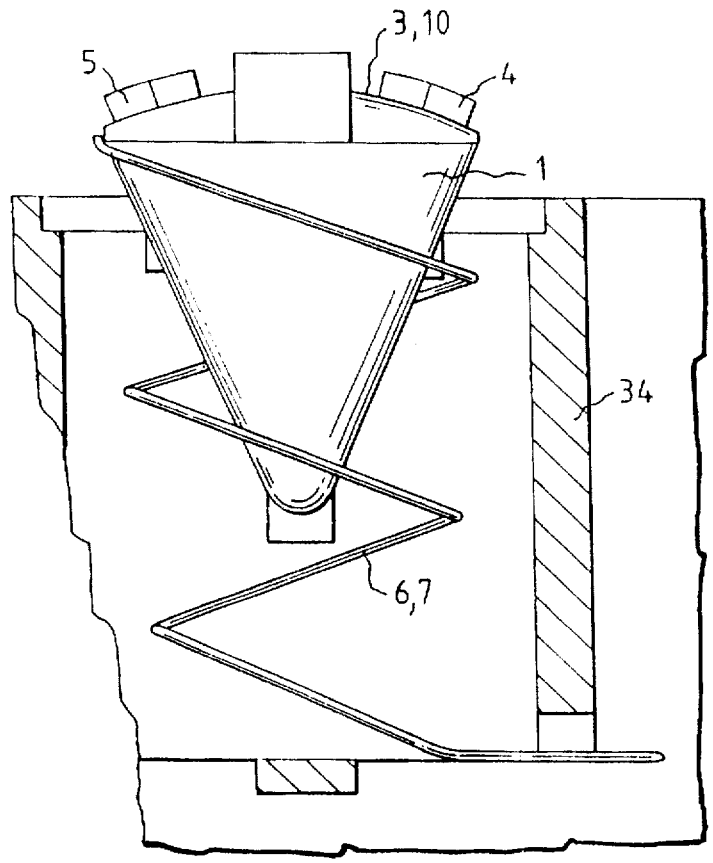
FIG. 7 is a side partially sectional view of the distribution device of FIG. 6 in mounting condition.

In FIGS. 4 to 7 specific embodiments of cone-type housing 1 and bell 2 closing the latter towards top are shown. The automatic distribution device can thus according to FIG. 5 be supported at a wall 31 by means of a collar 32, the exchange office and subscriber cables 6, 7 being inserted from below into bell 2 and fixed therein or at the bottom-side end of cone-type housing 1. FIGS. 6 and 7 show the particularly preferred arrangement of the automatic distribution device in an underground version, the automatic distribution device with cone-type housing 1 and bell 2 being supported within a pit 34 to be closed by a cover 33. Cable supply is achieved in spiral or helical manner from below outside cone-type housing 1 into bell 2. In this underground version, housing 1 with bell 2 operates to the Caisson principle and can be installed in flood-protected manner, and water possibly entering into pit 34 cannot enter into bell 2, since an air cushion protecting the line connections is formed therein. Cover 2 and housing 1 are configured such that during flooding water will be stopped still underneath the cable entries and will not enter into housing 1 even with defective seals.

After removing cover 33 from pit 34, the automatic distribution device can be lifted out by means of a lifting device according to FIG. 7, and can be connected after removing bell 2 in the area of subscriber cables 7. Exchange office cables 6 are only accessible after removal of cone-type housing 1, and for this purpose the latter can be designed as a two-part unit.

While specific embodiments of the invention have been shown and described in detail to illustrate the application of the principles of the invention, it will be understood that the invention may be embodied otherwise without departing from such principles.

What is claimed is:

1. An automatic re-arrangement and distribution device for telecommunication and data lines, comprising:

connection blocks with connection terminals for exchange office and subscriber lines;

connection means including a connection device with a grip element, said connection means being controllable remotely, said connection device being pivotably supported along a central axis, said grip element being movable radially to be swung out from the connection device;

cables providing said lines, said cables being one or both of copper cable and fiber optic cable, said copper cable having a copper cable control path at said blocks for connection and said fiber optic cable having a fiber cable control path at said blocks for connection, said copper cable control path and said fiber control path having identical lengths.

2. An automatic re-arrangement and distribution device according to claim 1, wherein at least some of said cables have plugs attached to ends thereof, said plugs comprising a locking mechanism preventing said plugs from falling out of said blocks and simultaneously providing transportation protection upon travel of the plug to a next position.

3. An automatic re-arrangement and distribution device according to claim 1, further comprising a swivel arm connected to said griping element and scanning elements are connected to said blocks for the exact positioning of said swivel arm with said gripping element on one of said plugs or a removal location at said blocks.

4. An automatic re-arrangement and distribution device according to claim 1, further comprising a steping motor for movement of said connection means, wherein said control paths are defined by numbers of steps of stepping motors.

5. An automatic re-arrangement and distribution device according to claim 1, wherein said blocks are provided with cable connections accessible from above, for the insertion of test plugs.

6. An automatic re-arrangement and distribution device according to claim 1, wherein said plugs have gripping surfaces.

7. An automatic re-arrangement and distribution device according to claim 1, further comprising controller means for optimizing said control paths by sending control signals for removing plugs from a depot one of said blocks assigned to a distribution segment, and by moving to the plug position from a reference position in the same direction.

8. An automatic re-arrangement and distribution device according to claim 7, wherein said reference position is simultaneously a test point and is provided with a plug position with test tapping portion permitting an inspection of said plugs or of said lines.

9. An automatic re-arrangement and distribution device according to claim 1, wherein control signals and a supply voltage are fed over a common double wire and separated in the distribution device by a switch.

10. An automatic re-arrangement and distribution device according to claim 1, wherein in a supply voltage of a standard subscriber line is used for charging the battery.

11. An automatic re-arrangement and distribution device according to claim 1, further comprising a cover and a housing configured such that by the Caisson principle during flooding water will be stopped still underneath the cable entries and will not enter into the interior of housing even with defective seals.

12. An automatic re-arrangement and distribution device according to claim 1, wherein said blocks are configured on the cable connection side as arcs adapted to spherical shape.

13. An automatic re-arrangement and distribution device according to claim 1, wherein said some of said blocks include insulation displacement contact elements and some of said blocks include fiber coupling elements and wherein said blocks are of substantially identical lengths.

* * * * *